| | | | |
|---|---|---|---|
| (12) | United States Patent<br>Balasaygun et al. | (10) Patent No.:<br>(45) Date of Patent: | US 8,638,911 B2<br>Jan. 28, 2014 |

(54) CLASSIFICATION OF VOICE MESSAGES BASED ON ANALYSIS OF THE CONTENT OF THE MESSAGE AND USER-PROVISIONED TAGGING RULES

(75) Inventors: Mehmet Balasaygun, Freehold, NJ (US); Michael J. Killian, Toms River, NJ (US)

(73) Assignee: Avaya Inc., Basking Ridge, NJ (US)

( * ) Notice: Subject to any disclaimer, the term of this patent is extended or adjusted under 35 U.S.C. 154(b) by 275 days.

(21) Appl. No.: 12/508,829

(22) Filed: Jul. 24, 2009

(65) Prior Publication Data

US 2011/0021178 A1 Jan. 27, 2011

(51) Int. Cl.
*H04M 1/64* (2006.01)

(52) U.S. Cl.
USPC .......... 379/88.22; 379/88.04; 379/88.06; 379/88.09; 455/412.1; 455/413; 455/466; 455/563; 704/220

(58) Field of Classification Search
USPC .......... 379/88.01, 88.04, 88.07, 88.08, 88.09, 379/88.22; 455/412.1, 412.2, 413
See application file for complete search history.

(56) References Cited

U.S. PATENT DOCUMENTS

| 6,335,962 | B1 * | 1/2002 | Ali et al. ..................... 379/88.11 |
|---|---|---|---|
| 6,510,207 | B1 * | 1/2003 | Cannon et al. .................. 379/68 |
| 6,651,042 | B1 * | 11/2003 | Field et al. .................... 704/270 |
| 7,143,044 | B2 * | 11/2006 | Zadrozny et al. ............. 704/275 |
| 7,222,075 | B2 * | 5/2007 | Petrushin ...................... 704/270 |
| 7,308,252 | B2 * | 12/2007 | Rybak et al. ............... 455/412.1 |
| 7,330,536 | B2 * | 2/2008 | Claudatos et al. .............. 379/68 |
| 7,664,636 | B1 * | 2/2010 | Hirschberg et al. ........... 704/231 |
| 7,751,534 | B2 * | 7/2010 | Sun ............................. 379/88.13 |
| 7,809,117 | B2 * | 10/2010 | Runge et al. ................ 379/88.13 |
| 8,041,589 | B1 * | 10/2011 | Blair et al. ..................... 705/7.11 |
| 8,270,588 | B2 * | 9/2012 | Schwartz ................. 379/210.02 |
| 2005/0129188 | A1 | 6/2005 | Lee et al. |
| 2007/0180042 | A1 * | 8/2007 | Benco et al. .................. 709/207 |
| 2008/0198981 | A1 | 8/2008 | Skakkebaek et al. |
| 2008/0232556 | A1 | 9/2008 | Gilbert et al. |
| 2008/0300871 | A1 * | 12/2008 | Gilbert .......................... 704/233 |
| 2009/0006085 | A1 * | 1/2009 | Horvitz et al. ................ 704/223 |
| 2009/0034693 | A1 * | 2/2009 | Anderson .................. 379/88.01 |

FOREIGN PATENT DOCUMENTS

| EP | 1058446 A2 | 12/2000 |
|---|---|---|
| EP | 1109390 A2 | 6/2001 |

OTHER PUBLICATIONS

Inanoglu et al., "Emotive Alert: HMM-Based Emotion Detection in Voicemail Messages", MIT Media Lab Technical Report No. 585 (Jan. 2005).*
Bhattacharjee, Yudhijit, "What's Next; Unearthing Information in an Avalanche of Voice Mail" New York Times; Apr. 25, 2002; 2 pages.

* cited by examiner

*Primary Examiner* — Anthony Addy
*Assistant Examiner* — Michael S Bush
(74) *Attorney, Agent, or Firm* — Sheridan Ross P.C.

(57) ABSTRACT

One or more tags are associated with a voice or multimedia message. These tags can be applied to the message based on one or more of an analysis of the message, rules, caller information, presence information, user input and GPS information. Based on the assigned and associated tags, one or more of message handling, classification and one or more actions can be automatically invoked to assist with management of messages. An interface is also provided that allows for the management of the assigned tags as well as the editing and creation of new tags and rules to assist with message management.

19 Claims, 4 Drawing Sheets

| Message | Tag(s) | Action Type(s) | Classification |
|---|---|---|---|
| Message 1 | Urgent System Down | Prioritize | System Status |
| Message 2 | Personal Call | None | Personal |
| Message 3 | Supervisor | None | Company |
| Message 4 | Supervisor | None | |
| Message 5 | Supervisor | Prioritize | |
| Message 6 | Customer Escalation | Prioritize Fwd. to Supervisor | Company - S |
| . | | | |
| . | | | |
| . | | | |
| Message n | | | |

CLASSIFICATION OF VOICE MESSAGES BASED ON ANALYSIS OF THE CONTENT OF THE MESSAGE AND USER-PROVISIONED TAGGING RULES

FIELD OF THE INVENTION

An exemplary aspect of the invention relates to enhanced communications. More specifically, an exemplary aspect of the invention relates to applying voice tags to a voicemail message, such as in the header, so that a voicemail message can be easily searched or to assist with alerting the user to message waiting content. Even more particularly, an exemplary aspect is directed toward classification of a voice message based on various tags or factors, and prioritization of tags based on a combination of content of the message and user-provisioned priority levels.

BACKGROUND OF THE INVENTION

Voicemail is a centralized system managing telephone messages for a user, and is commonly seen in enterprise-type environments where a voicemail system provides telephone message management for a large number of people. A typical voicemail system can allow the answering and recording of multiple voicemail messages in parallel. Additional functionality often associated with voicemail systems is the ability to store incoming voice messages in personalized mailboxes associated with a particular user's phone number or extension. Users are capable of forwarding messages to another mailbox, and sending messages to one or more voicemail users. In conjunction with both of these functions, a user can add a voice introduction to a forwarded message and store a voice message for future delivery to one or more other users.

Other functionality associated with voicemail systems is the ability to make calls to a telephone or paging service to notify a user a message has arrived in their mailbox, as well as the ability to provide messaging notification by SMS, a special dial tone, one or more lights, or using caller ID signaling. Furthermore, a user can be alerted to the existence of a new voicemail message through the integration and communication between the voice message server and a mail client. For example, a voicemail server can forward a .wav file that includes the left message to an email server that then displays the voicemail message as a playable file in a user's mailbox.

There are also automated voicemail systems for processing incoming speech based on messages. For example, a voicemail processor includes a transcription component for transcribing one or more voicemail messages into text, a text retrieval component for indexing the one or more transcribed voicemail messages, and information extraction component for identifying selected information within the one or more indexed voicemail messages, and a user interface for displaying the identified selected information from the one or more indexed voicemail messages.

SUMMARY OF THE INVENTION

As discussed, most current voice messaging systems provide basic voice message organization and listing, as well as alerting based on very basic rules, such as the caller ID, and a priority assigned to a voice message by the caller. While this is somewhat productive to a messaging system subscriber, there can be significant productivity improvement if user-defined message tags and user-specified rules about the tags' usage can be used by the messaging system to apply different message treatment options.

One exemplary aspect of the present invention makes use of message tagging abilities to create enhanced message treatment options that are not possible through the basic/standard message identification mechanisms such as time-of-day, caller ID, message type (e.g., marked as "high priority" or "private").

More specifically, one exemplary aspect allows the assignment of varying levels of "priorities" to tags based on user-provisioned rules and analysis of the message. For example, the system can look into the "surrounding" aspects of a voice message in addition to the spoken words. For example, the emotion that the caller presents during the voice message (e.g., anger, sadness, voice tone, and the like) and environment (e.g., background noise, airport, train station, noisy factory floor, in the car, quiet, and the like) can be detected based on user rules and be used in the tagging of the message. For example, a voice message from User X can be generally tagged as normal priority. However, when this user calls from the factory floor (based on the ambient noise detected by the messaging system), the system can assign a high priority tag to User X's message because the voice message is likely to be related to a problem experienced on the factory floor. This dynamic prioritization of tags provides new and useful benefits to assist with management of voicemail.

In accordance with another exemplary embodiment, management of voicemail messages go beyond a simple alerting scheme based on the presence of one or more tags. For example, a plurality of different voice message treatment options, such as prioritization of a message based not only on spoken words but also ambient noise, can be provided. The combination of tags associated with each voice message can also be used to take additional action by the voice messaging system based on subscriber-provided tag processing rules. For example, based on the word "call me" detected in the voice message, and the caller ID information, a particular message can be tagged as a high priority, and the "call me" tag rule may be defined such as to send an SMS message to the caller when the message is listened to by the mailbox subscriber. Alternatively, or in addition, a screen pop alert could be sent to an IP phone.

According to an exemplary embodiment, additional functionality is provided to the voicemail system. This additional functionality includes tag provisioning, message recording and tag detection, and an action function.

For tag provisioning, the messaging system can accept input from a user about tags that the user is interested in. These tags can be provisioned using text or voice (TUI) interfaces. Additionally, a graphical user interface (GUI) could also be used to assist with tagged provisioning. The tags can include additional pre-provisioned macros such as the background noise level, background noise characteristics of the message that is recorded by the system, and the like. In other words, tags can be built using predefined macros, such as {caller ID}, combined with {time-of-day}, combined with {background noise profile}, or other key words, even GPS information carried in a voice message header about the caller's location. The value of certain tags can be used to pull additional context sensitive tag(s) into the analysis. For example, caller ID information or time-of-day information could be used to pull in additional tags for which the message is analyzed. This analysis can be subsequently used for categorization and routing purposes as discussed hereinafter.

For message recording and tag detection, standard message recording functionality can be provided. The recording system can deploy speech analysis algorithm(s) to analyze the message in real-time or after it is recorded, to determine if the message contains any of the tag(s) provisioned by the user.

For taking action(s) associated with a tag(s), the messaging system is capable of taking an action based on the presence of one or more tags in a voice messaging system. For example, a received voice stream is recorded. One or more subscriber-provided tag detection rules can be applied to the recorded voice stream for the real-time creation of tags, or the creation of tags after the voice stream has been recorded and stored in a message envelope with additional information. Any tags determined to be appropriate for the recorded voice message can then be associated with the message and stored. Once stored, the one or more tags associated with the message can be analyzed and one or more actions taken based on that analysis.

Therefore, classification of a voice message can be accomplished based on various tag/factors, such as caller ID, context of the message (based on real-time message analysis and assignment of tag(s) to the message) and the prioritization of tags based on the combination of content of the message and user-provisioned priority levels.

Action(s) taken by the voice messaging system can be based on one or more of an analysis of voice tags present in a voice and tag action rules. Priorities of tags can be used as a weighing option when determining which action(s) should be taken by the voice messaging system. Examples of actions include one or more of a SMS, a screen pop, forwarding or routing, and the like.

Accordingly, an additional aspect of the invention relates to classification of a voice message based on various tag/factors, such as caller ID, context of the message, content of the message, and message metadata based on one or more of real-time or non-real-time message analysis, assignment of tags, and action(s) based on the tags.

Prioritization of tags based on the combination of content of the message in user-provisioned priority levels at least provides enhanced voicemail management, especially when combined with one or more actions taken by the voice messaging system based on analysis of voice tags present in a voice and tagging action rule set. Priorities of tags can be used as a weighing option when determining which action(s) should be taken by the voice messaging system.

Non-limiting examples of tags defined by a user can be one or more of the following:

1. Word(s)/Phrase(s) that Appear in a Voice Message.

For example, how many times a specific word is used in a message may result in the appropriate characterization and/or categorization of the message.

As another example, detection of "let me know" could be provisioned by the user as a tag-action that makes the messaging system send a notification to the caller that the message is listened to.

2. Voice Level of the Caller.

For example, one or more of volume, pitch, detection of an emotion, such as sadness or anger, can be used to prioritize the message. For example, comparison of the voice characteristics of the caller against the "normal" voice characteristics of the caller, in the use of different emotion "profiles" can be used to assist with determining whether the voice characteristics are "normal." More specifically, one exemplary embodiment includes the ability to use a frequency spectrum analysis of the voice imprint to determine an emotion about a caller based on a comparison to "normal" voice characteristics.

3. Ambient Noise in a Message.

For example, ambient noise could be utilized to assist with tagging based on a location able to be identified based on noise in the recorded message. This can also be used to assist with determining the quality of the message.

4. Time-of-Day.

Time-of-day and/or date information can also be used to assist with one or more of classification and action-tagging.

5. GPS Location of a Caller.

For example, whether signaled in-band, DTMF, or out-of-band, a GPS location received by a messaging system can be used as a tag, and, for example, the GPS location along with voice tone and spoken words can be used to prioritize a message as discussed.

6. Gestures.

For example, if a system is a voice and video messaging system, gesture recognition can be utilized with corresponding tag(s) assigned to a detected gesture.

7. Repeated Words in a Message.

For example, repeated words can be detected with the repeated words triggering, for example, a rule that specifies one or more actions.

8. Caller ID Information.

For example, caller ID information along with tags detected in a message can be used in escalating a particular voice message. For example, Customer X calls Employee A in a company about an important issue. The messaging system can detect this message needs to be escalated if it has not been listened to in a specified time interval, say in the next four hours. If the interval lapses and the message has not been listened to, the message can be automatically copied into Employee A's supervisor's mailbox.

Similarly, if a caller leaves more than one message in a given period of time, this can meet the criteria of a tag-action that: again escalates the message to a supervisor, copies the message to another peer's mailbox, triggers a SMS or screen pop, and/or provides more proactive alerting.

9. Codec Used in a Message.

For example, the detection of a codec can be used to assist with assigning a quality tag to a message.

As discussed, based on the assignment of one or more tags to a message, one or more actions can be taken by the voice message system. For example, some exemplary actions are classification of messages (e.g., priority, forwarding options, forwarding, and the like, disposition of messages to one or more destinations, and notification of the caller about a message).

In accordance with another exemplary embodiment, classification of voice message can be based on various factors, such as caller ID, context of the message, based on real-time message analysis and assignment of tag(s) to the message. This information, along with the user-specified policy(s), can then be used to organize and prioritize messages, intake follow-up actions, such as setting urgency in the message, waiting alerts, and the like.

One exemplary benefit associated with an embodiment of the present invention is that transcribing of the entire voice message is not required. At the end of the message analysis, the message does not necessarily need to be speech-to-text converted and the entire message does not necessarily need to be stored as a text message. One exemplary embodiment is directed toward analyzing the incoming voice message, searching for key words in the message, and based on the key words found in the message, assigning one or more tags to the voice message. These tags can be in text form, and can be stored along with the voice message header information.

The key words can be previously identified words selected by the voicemail recipient and/or from a template. For example, if the caller ID was from Amy, a project manager on project Zebra, then any voice message from Amy that includes the word zebra could be tagged with the term "Zebra." The tags may also include the caller's name, the purpose of the call, the word "date" (instead of a particular date), company names, the word "telephone number" or "number" (instead of a particular telephone number) and any other relevant tags the voice mail recipient wants to include. The "tags" can be used to classify a voice message, for example, assign a priority order based on the tags associated with the message and user specified rules. A simple rule may be about assigning high priority, or in addition a proactive alert, to any message left by a particular caller and to search through a list of voice messages, order the message list, and assign urgency to a message(s) with waiting alerts.

An exemplary embodiment could utilize a Touch-Tone User Interface (TUI), GUI, or comparable interface so that the voicemail recipient can search for a word via the interface. A GUI interface could also be used to list the key words used in the voice tag. Then a mapping algorithm could be used to map the typed-in keywords to the phonemic representation. Other methods could also be used to map the key words into an audio representation of the word.

In accordance with another exemplary embodiment, there are multiple tags per voice message. Each tag for a message allows the message to be associated with multiple items, such as, individuals, for example a group, folders, topics, or in general any one or more items. Therefore, a message may be linked to multiple items (e.g., project Zebra, those members of project Zebra, or Amy, where each group may be associated with at least one tag).

The selected keywords that are tagged can also be "learned" by the system. For example, the message recipient can set a policy that tells the system to tag the message based upon the most frequently used word in a message. Alternatively, the system could be instructed to tag the message based on how many people were speaking during the recording of the message. For example, some of the tags may not be derived from spoken words, but from other aspects of the voice message. For example, if there are 5 individuals leaving you a recording of the song "Happy Birthday" the voice tags associated with the message could be "friends" and "Happy Birthday." Alternatively, there could be an incoming voice message from a client that sounds very agitated. The "voice tags" could be an identification of the client and the tag "upset" with the marking of urgent to address the issue quickly.

In accordance with another exemplary embodiment, the one or more voice tags could be used to assist with automatic routing or priority setting of the voicemail message to the appropriate folder in the voicemail recipient's message directory.

Furthermore, the basic techniques disclosed herein can be extended to multimedia messaging, for example, that includes voice and video messages. The addition of a second or additional media type creates new types of tags and new kinds of tag-actions that the system can apply to a message. In addition, existing tags, such as emotion of a caller based on their gestures, surrounding environment about a caller, and the like, can be extended to incorporate video analysis as input to tags. For example, one analysis could be whether caller was alone or with other people, or perhaps even include an analysis of the type of environment the caller is calling from, e.g., home, office, mobile, or the like.

Aspects of the present invention are further directed toward the ability to define different kinds of tags with different priorities (not just occurrence of a message, but also number of times a particular word occurs in a message). The tags themselves can be assigned different priority levels which are used in determining how the message should be treated. Furthermore, different actionable items can be defined based on the set of tag(s) associated with a message. For example, in addition to the ability to ease searching through one or more messages, this can be done to also assist with message priority, characterization, disposition to other subscribers, message escalation, message notification, message handling, message management, and the like.

Additional aspects of the invention relate to applying voice tag(s) to a voicemail message header so that a voicemail message can be easily searched or used for alerting the user to message waiting content.

Aspects of the invention additionally relate to management of one or more message based on an assigned tag(s). The tags can be assigned based on one or more of a manual assigned, an automated assignment, or a combination of automated and manual assignment of a tag to a message.

Additional aspects of the invention relate to rules that assist with management of one or more messages based on associated tags.

Even further aspects of the invention relate to the assignment of tags based on one or more of content, context, rules, keyword identification, caller ID identification, emotion information, GPS and/or presence information, and the like.

Even further aspects of the invention are directed toward message management in a voicemail environment based on one or more tags and one or more rules.

Even further aspects of the invention relate to an enhanced set of rules and tags that can be utilized with multimedia messages.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide enhanced communications. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figures 1, 2:
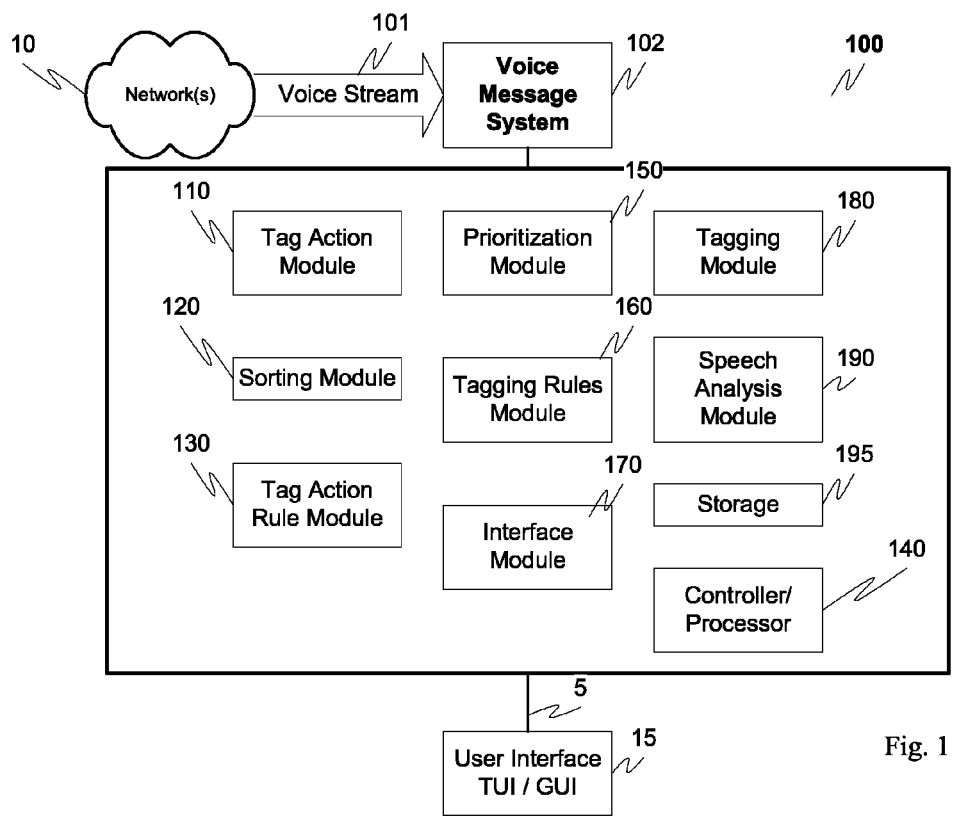
FIG. 1 illustrates an exemplary voice messaging system according to this invention.
FIG. 2 illustrates an exemplary user interface associated with message, tag and action management according to this invention.

FIG. 1 illustrates an exemplary embodiment of the enhanced messaging system 100. The enhanced messaging system 100 comprises a voice message system 102 that is associated with a tag action module 110, a sorting module 120, a tag action rule module 130, processor 140, prioritization module 150, tagging rules module 160, interface module 170, tagging module 180, speech analysis module 190 and storage 195.

The enhanced messaging system 100 is also associated with a user interface, such as a TUI or GUI 15 as well as the voice message system 102 that receives one or more voice streams 101 via network(s) 10.

In operation, a voice stream 101 (or multi-media stream) is received by the voice messaging system 102. Either in real time, or after saving of a voice message, the voice stream is analyzed in conjunction with one or more of the speech analysis module 190 and tagging module 180. More specifically, the modules can associate one or more tags with the voice message based on one or more of content, caller ID, characteristics of the call, emotions associated with the call and additional factors, such as presence information, GPS information, and/or user supplied tags. Next, in conjunction with the controller 140, the one or more tags are associated with the message. The tags can be saved with the message, or stored separately and associated with the saved voice message by virtue of an identifier.

Next, and in cooperation with one or more of the sorting module 120, prioritization module 150 and tagging rules module 160, one or more of the one or more tags associated with a message are analyzed. The sorting module 120 can then optionally classify and/or rank the message based upon the presence of one or more tags. For example, and in cooperation with the tagging rules module 160, one or more rules can be defined that establish the manner in which a message should be classified or ranked.

Along with this classification and/or ranking, one or more of a priority flag, predetermined ranking, or classification code can also be associated with a message which can be manifested as an additional tag, or as a separate identifier.

As discussed in greater detail hereinafter, based on one or more of these preliminary actions, and in conjunction with the tag action module 110, one or more of a notice, alert, and routing of the message to one or more destinations can occur based on the presence of these one or more tags.

In determining whether an action should be taken based on one or more tags associated with a message, the tag action module 110 receives a tagged message and analyzes the tags associated with the message. Then, in conjunction with tag action rule module 130, one or more actions defined by the rules are taken based on the tag(s) associated with the message. Examples of these actions include one or more of forwarding, archiving, replying to, sorting, alerting and optionally reclassifying based on, for example, a need to recategorize and/or reprioritize a particular message.

The tag action rule module 130 and tagging rules module 160 cooperate to assist with the assigning of one or more tags to a message as well as the handling and management of a message once one or more tags are assigned. For example, and in conjunction with the interface module 170 and the user interface 15, a user can establish rules that determine and define how tags are to be applied, as well as an associated action, if any, associated with a tag or set of tags. These rules can be one or more of predefined, based on a template, or user generated and can be imported and/or exported as desired. As discussed, the rules can take into consideration any aspect of a message, be it stored in the metadata, associated with the tag, content or context of the message, call metadata information associated with a call envelope, or in general any information associated with or contained in a message.

Moreover, the assignment of tags and applied actions need not be message centric, but could be dynamic and based on, for example, a number of messages, as discussed above. For example, if a certain individual leaves a message multiple times, and there is an excited emotional state associated with that message, tag action module 110, prioritization module 150 and rules modules can cooperate to ensure the desired handling of those messages.

FIG. 2 illustrates an exemplary interface 200 that shows a series of messages 210, tags associated with each of those respective messages 220, one or more actions associated with each of the respective messages 230 and a classification assigned to each of the respective messages 240. More specifically, message 2 202 has been tagged as a personal call 204. There is no action 206 to be taken and the message has been classified as a personal call 208. Additionally, the sorting module 120 can, based on the classification as a personal call 208, perform dynamic ranking in relation to other messages in the system.

As another example, message 6 212 is an exemplary high-priority message. The tags associated with message 6 are that it is a customer, and that the message requires escalation 214. For example, and based on the assignment of these two tags 214, the associated actions can be to prioritize the message with a high ranking 216, as well as, for example, forwarding the message to a supervisor if response to the message has not been completed within a predetermined amount of time 216.1. This could be accompanied by a SMS alter and/or a screen pop on a phone associated with the supervisor. The classification associated with this message is that it is company-centric 218 for the "S"ervice team.

Figure 3:
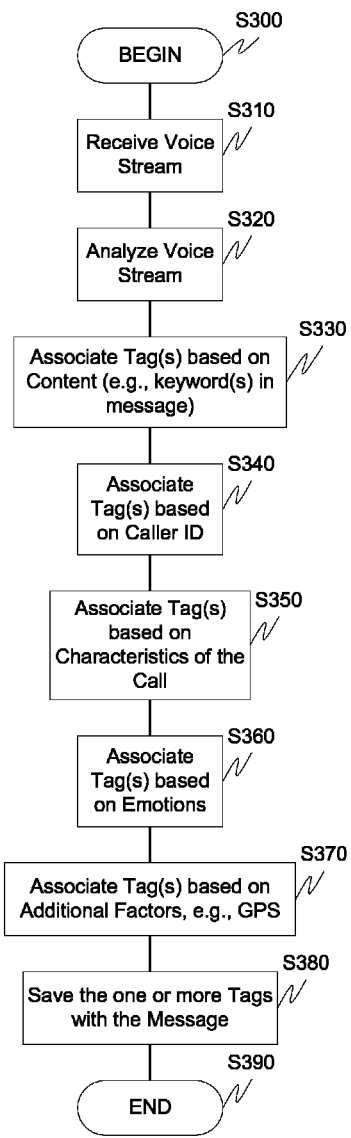
FIG. 3 is a flowchart outlining an exemplary method for associating one or more tags with a message.

FIG. 3 outlines an exemplary method of associating one or more tags with one or more messages according to this invention. While the methodology outlined in FIG. 3 depicts the actions according in a sequential order, it should be appreciated the certain steps can be performed in parallel. In particular, control begins in step S300 and continues to step S310. In step S310, a voice stream is received. Next, in step S320, the voice stream is analyzed, for example, by performing speech-to-text, emotion analysis, and/or the analysis of other information associated with the message as discussed above. Then, in step S330, one or more tags are optionally associated with the message based on content.

In step S340, one or more tags are optionally associated with a message based on caller ID information. Next, in step S350, one or more tags are optionally associated with the message based on characteristics of the call. Then, in step S360, one or more tags are optionally associated with a message based on a detected emotion(s). Control then continues to step S370.

In step S370, one or more tags are optionally associated with a message based on additionally factors, such as GPS information, presence information, or the like. Next, in step S380, the one or more tags are saved or are otherwise associated with the message, or control continues to step S390 where the control sequence ends.

Figure 4:
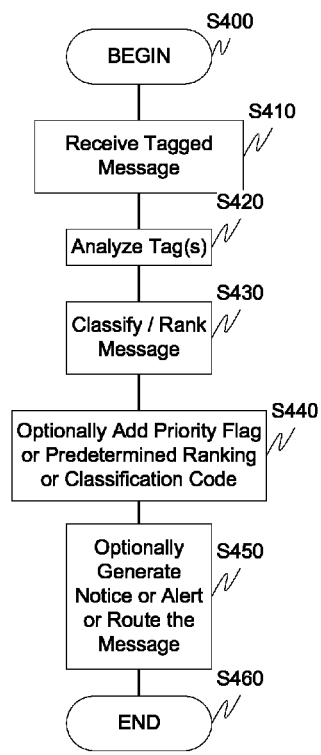
FIG. 4 is a flowchart outlining an exemplary method for specifying and prioritizing a message according to this invention.

FIG. 4 outlines an exemplary method of classifying, ranking, or prioritizing one or more messages according to an exemplary embodiment of this invention. In particular, control begins in step S400 and continues to step S410. In step S410, a tagged message is received and analyzed in step S420. Next, in step S430, the message can optionally be classified and/or ranked based on the analysis of the one or more tags. Then, in step S440, one or more priority flags, predetermined rankings, and/or classification codes are optionally associated with the message. Furthermore, in step S450, one or more notices, alerts, or routing(s) of the message to one or more destinations is performed. This forwarding or routing of the message can include one or more previously associated tags, as well as, for example, additional tags that indicate the message has been forwarded, who it was forwarded from, and the rule utilized to determine that forwarding was appropriate. Control then continues to step S460 where the control sequence ends.

Figure 5:
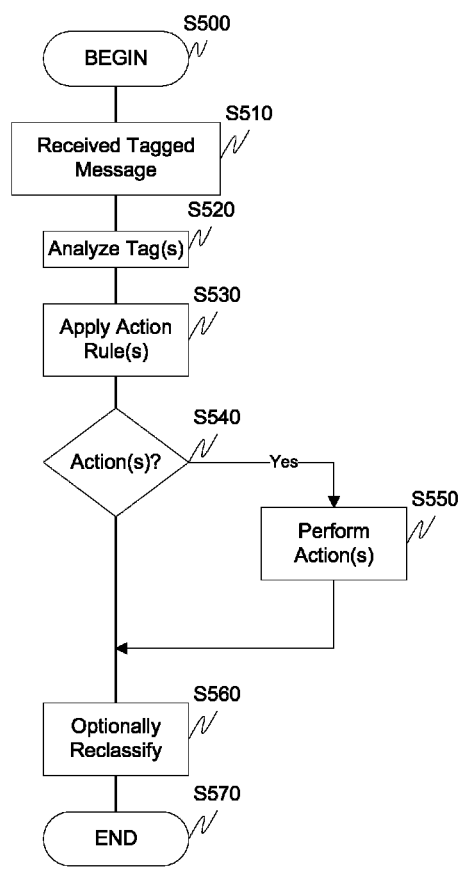
FIG. 5 is a flowchart outlining an exemplary method for applying one or more rules based on one or more tags according to this invention.

FIG. 5 illustrates an exemplary method of applying one or more actions based on one or more tags according to an exemplary embodiment of this invention. In particular, control begins in step S500 and continues to step S510. In step S510, a tagged message is received. Next, in step S520, the one or more associated tags are analyzed. Then, in step S530, one or more tag action rules are applied and control continues to step S540.

In step S540, a determination is made if an action should be taken based upon the action rules. If an action should be taken, control continues to step S550 where the one or more actions are performed. Otherwise, control jumps to step S560 where the message can optionally be reclassified with control continuing to step S570 where the control sequence ends.

For example, if Caller X leaves 4 messages, which are tagged with an urgent tag, a product support tag and a priority handling tag, the 4 messages can be sorted and prioritized such that these 4 messages are grouped playable by a user before other messages. Additionally, an action could be assigned based on the tags that forwarded the group of 4 messages to one or more additional destinations if the messages are, for example, not listened to within 2 hours.

A number of variations and modifications of the invention can be used. It would be possible to provide or claims for some features of the invention without providing or claiming others.

The exemplary systems and methods of this invention have been described in relation to enhancing communications, and in particular voice mail. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A message management method comprising:
receiving a message, the received message being a voice stream or a multimedia stream that is storable in a messaging system;
dynamically assigning, by a tagging module, one or more of one or more user defined message tags and tags to the received message based on an analysis of the received message, the analysis including an analysis of an emotion of a caller, an environment of the caller and a defined number of messages left by the caller within a period of time, wherein analyzing the emotion of the caller is accomplished by comparing a voice characteristic of the caller against a normal voice characteristic of the caller, wherein the message is further analyzed to determine how many people were speaking during a recording of the message and wherein the one or more message tags indicate how many people were speaking during the recording of the message or indicate that a plurality of people left the message; and
analyzing the assigned one or more message tags and tags to the message, and invoking one or more of a tag action module, a prioritization module, and a sorting module to one or more of perform an action, assign a priority, and assign a rank, respectively, wherein higher priority messages are grouped and are playable before other messages and wherein the received message is further analyzed to determine how many people were speaking during a recording of the received message and wherein the assigned one or more message tags and tags to the message indicate how many people were speaking during the recording of the received message or indicate that a plurality of people left the received message.

2. The method of claim 1, wherein the assigning is based on one or more of a rule and a user assignment.

3. The method of claim 1, further comprising generating one or more alerts based on the assigned one or more message tags and tags to the message.

4. The method of claim 1, further comprising forwarding the message to one or more destinations based on the assigned one or more message tags and tags to the message.

5. The method of claim 1, further comprising one or more of classifying and ranking the message based on the assigned one or more message tags and tags to the message.

6. The method of claim 1, wherein an interface allows one or more of tag management, tag editing, tag assigning, tag creation, rule management, rule editing and rule creation.

7. A plurality of means for performing the steps of claim 1.

8. A tangible and non-transitory computer-readable storage media having instructions stored thereon that, when executed by a processor, perform the steps of claim 1.

9. The method of claim 1, further comprising the step of detecting repeated words in the received message, wherein detecting the repeated words in the received message is based on a rule that specifies one or more actions.

10. The method of claim 1, wherein the received message is the multimedia stream and wherein the analysis of the environment of the caller comprises a video analysis of the environment of the caller to determine a location that the caller is calling from.

11. The method of claim 1, wherein the assigning step is also based on caller ID information associated with the received message and a specified time period that the received message needs to be listened to and wherein the received message is escalated if the received message is not listened to within the specific time period.

12. A message management system comprising:
a tagging module and processor that assign one or more of one or more user defined message tags to a received message based on an analysis of the received message, the analysis including an analysis of an emotion of a caller, an environment of the caller and a defined number of messages left by the caller within a period of time, wherein analyzing the emotion of the caller is accomplished by comparing a voice characteristic of the caller against a normal voice characteristic of the caller, wherein the received message being a voice stream or a multimedia stream that is storable in a messaging system, wherein the message is further analyzed to determine how many people were speaking during a recording of the message and wherein the one or more message tags indicate how many people were speaking during the recording of the message or indicate that a plurality of people left the message; and
one or more of a tag action module, a prioritization module and a sorting module to one or more of perform an action, assign a priority, and assign a rank, respectively, based on an analysis of the assigned one or more message tags, wherein higher priority messages are grouped and are playable before other messages and wherein the received message is further analyzed to determine how many people were speaking during a recording of the received message and wherein the assigned one or more message tags indicate how many people were speaking during the recording of the received message or indicate that a plurality of people left the received message.

13. The system of claim 12, wherein the assigning is based on one or more of a rule and a user assignment.

14. The system of claim 12, wherein the assigned one or more message tags cause generation of one or more alerts based on the one or more tags and forwarding of the received message to one or more destinations based on the assigned one or more message tags.

15. The system of claim 12, wherein the assigning is based on one or more of content of the received message, caller ID information associated with the received message, characteristics of the message, emotion of the received message, context of the received message, presence information associated with the received message and GPS information associated with the received message.

16. The system of claim 12, wherein the received message is one or more of classified and ranked based on the assigned one or more message tags.

17. The system of claim 12, wherein the assigned one or more message tags are stored in a message header.

18. The system of claim 12, wherein an interface allows one or more of tag management, tag editing, tag assigning, tag creation, rule management, rule editing and rule creation.

19. The system of claim 12, wherein speech-to-text analysis of the received message is performed in conjunction with one or more rules to assign the one or more message tags.

\* \* \* \* \*